UNITED STATES PATENT OFFICE.

FRITZ ACH, OF MANNHEIM, GERMANY, ASSIGNOR TO THE FIRM OF C. F. BOEHRINGER & SOEHNE, OF MANNHEIM-WALDHOF, BADEN, GERMANY.

PARAMETHYL-AMIDOPHENYL-GLYOXYLIC ACID AND PROCESS OF MAKING SAME.

SPECIFICATION forming part of Letters Patent No. 708,511, dated September 9, 1902.

Application filed May 29, 1900. Serial No. 18,425. (No specimens.)

*To all whom it may concern:*

Be it known that I, FRITZ ACH, a citizen of the Empire of Germany, residing at Mannheim, in the Empire of Germany, have invented certain new and useful Improvements in Preparation of Para - Amidophenylglyoxylic Acids; and I do hereby declare the following to be a full, clear, and exact description of the invention, such as will enable others skilled in the art to which it appertains to make and use the same.

This invention relates to the art of preparing para-amido-phenylglyoxylic acid proper and its derivatives and homologues, all of which I designate by the generic term "para-amido-phenylglyoxylic acids."

The object of the said invention is to simplify the manufacture of these products.

In my application for Letters Patent of the United States, Serial No. 18,425, filed concurrently herewith I have described a method whereby these acids may be readily prepared from the corresponding para-amido-phenyl-tartronic acids by oxidation methods. I have found by further researches and experiments in this field that I may dispense with the preliminary production of para-amido-phenyl-tartronic acids from the corresponding condensation products of alloxan with aromatic bases, according to my application, Serial No. 731,674, filed September 25, 1899, (Case W,) but may carry out the preparation of the amido-phenyl-tartronic acids and the oxidation of these to the corresponding amido-phenylglyoxylic acids in one and the same operation and that this may be done by saponifying the amido-phenyl-tartronic ureids with an alkaline hydrate, such as caustic potash or barium hydrate, in the presence of a suitable oxidizing agent, such as mercuric oxid, manganic oxid, or peroxid of lead. Instead of the amido-phenyltartronic ureids the acids formed from these products, according to Pelizzari, (see *Gazetta Chimica,* Vol. 17, page 412, *et seq.*,) by subjecting to dilute alkali in the cold, and which are distinguished from the starting products by the elimination of NHCO, may be employed, and these acids are the equivalents of the amido - phenyl-tartronic ureids wherever mentioned in the claims appended to this specification.

My invention, whose nature is above stated, will now be set forth more in detail by the aid of the following examples, which constitute the preferred embodiment of the same.

1. *Preparation of para-methylamido-phenylglyoxylic acid from monomethylanilalloxan.*—Five parts of methylanilalloxan are dissolved in sixty parts, by volume, of normal potash lye (KHO) and 8.5 parts of freshly-precipitated mercuric oxid are added thereto, and the whole is boiled in a reflux apparatus until the odor of the ammonia has disappeared. The whole is then placed on the filter to separate the unchanged mercuric oxid and reduced mercury, and the filtrate is then evaporated to dryness. The residue is repeatedly boiled or digested with alcohol, and the resultant product is then evaporated. The residue after this operation is the potassium salt of the para-methylamidophenylglyoxylic acid, from which the free acid is obtained by dissolving in water, treating with carbon, such as animal charcoal, to decolorize and purify, and slightly acidulating with a mineral acid, such as hydrochloric acid. The para-methylamido-phenylglyoxylic acid is thereby precipitated as an orange crystalline powder, having all the properties recited in Patent No. 676,860. The reaction which takes place in the formation of this new compound under the above process is indicated in the following equation:

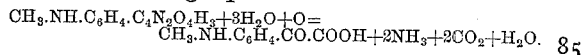

2. *Preparation of para-dimethylamidophenylglyoxylic acid from the acid $C_{11}H_{12}N_2O_3$ of Pelizzari.*—Five parts of the acid $C_{11}H_{12}N_2O_3$, made according to Pelizzari from dimethyl-anilalloxan by subjecting the same to the action of ten per cent. alkali and isolated by acidulating with acetic acid, (see *Gazetta Chimica Italiania,* Vol. 17, page 419,) are dissolved in twenty-three parts, by volume, of normal potash-lye, (KHO,) and then three parts of finely-powdered brownstone ($MnO_2$) are added thereto, and the whole is heated to and maintained at the boiling-point until the evolution of ammonia has ceased. The whole is then put on the filter while still hot to separate from the residual manganic sediment, and the filtrate is acidulated with hydrochloric acid until it gives a weak reaction on congo-paper. Thereby the resultant para-dimethylamido-phenylglyoxylic acid is precipitated in the form of fine yellow shining scales or plates, which are allowed to stand for several hours, whereupon the mother-liquor is drained from them by siphoning, decanting, or other suitable method. The reaction which takes place in this process is indicated by the equation:

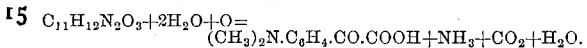

$$C_{11}H_{12}N_2O_3 + 2H_2O + O = (CH_3)_2N \cdot C_6H_4 \cdot CO \cdot COOH + NH_3 + CO_2 + H_2O.$$

3. *Preparation of para-amido-meta-toluyl-glyoxylic acid from ortho-toluidin-alloxan.*—Five parts ortho-toluidin-alloxan are dissolved in fifty-two parts, by volume, of double normal soda-lye, (NaHO,) whereupon a further amount of thirty-five parts, by volume, of the double normal soda-lye is added, and finally a solution of 9.4 parts of mercuric chlorid in twenty to twenty-five parts of water is poured into the first solution, and the whole is boiled concurrently with the circulation of air through the bath until all evolution of ammonia has ceased. The whole is then placed on the filter, and the filtrate is evaporated down to beginning of crystallization. It is then allowed to cool and the liquor drained from the crystals in any suitable way. The residual crystalline mass is dissolved in warm water, acidulated with strong hydrochloric acid, and again allowed to cool, when the para-amido-meta-toluylglyoxylic acid will be found to have been precipitated as an orange-yellow crystalline powder, possessing the properties enumerated in my above-mentioned application. The reaction which takes place in the formation of the alkali salt and in the separation of the new acid therefrom is indicated in the following two equations:

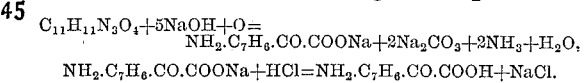

$$C_{11}H_{11}N_3O_4 + 5NaOH + O = NH_2 \cdot C_7H_6 \cdot CO \cdot COONa + 2Na_2CO_3 + 2NH_3 + H_2O.$$
$$NH_2 \cdot C_7H_6 \cdot CO \cdot COONa + HCl = NH_2 \cdot C_7H_6 \cdot CO \cdot COOH + NaCl.$$

4. *Preparation of para-methylbenzylamido-phenylglyoxylic acid from methyl-benzylanil-alloxan.*—3.4 parts of methyl-benzylanilalloxan are dissolved in forty-four parts, by volume, of double normal soda-lye and heated to boiling. Thereupon a solution of 4.7 parts mercuric chlorid in ten parts of water is run into the first solution, and the whole is boiled until the development of ammonia ceases. The mixture is now placed on the filter and the filtrate acidulated with hydrochloric acid, whereby the methyl-benzylamido-phenylglyoxylic acid is precipitated in the form of fine acicular crystals.

It will be seen from the above that the acids derived according to Pelizzari from the amidophenyl-tartronic ureids are in all respects the equivalents of these ureids so far as this invention is concerned, and the claims, while mentioning only the ureids, are therefore to be construed as covering the use of said acids as well as equivalents.

What I claim, and desire to secure by Letters Patent of the United States, is—

1. The process of preparing para-amidophenyl-glyoxylic acid which consists in treating amidophenyltartronyl-ureids with an oxidizing agent in the presence of alkali.

2. The process of preparing para-amidophenyl-glyoxylic acid which consists in dissolving an amidophenyltartronyl-ureid in an alkali and acting on the solution with an oxidizing agent.

3. The process which consists in dissolving an amidophenyltartronyl-ureid in an alkali solution, adding an oxidizing reagent thereto and boiling until the generated ammonia is driven off.

4. The process which consists in dissolving an amidophenyltartronyl-ureid in an alkali solution, adding an oxidizing reagent thereto and boiling in a reflux apparatus until the generated ammonia is driven off.

5. The process which consists in dissolving an amidophenyltartronyl-ureid in an alkali solution, adding an oxidizing reagent thereto and boiling in a reflux apparatus until the generated ammonia is driven off, then filtering and evaporating the filtrate, whereby the alkali salt of the new acid is obtained.

6. The process which consists in dissolving an amidophenyltartronyl-ureid in an alkali solution, adding an oxidizing reagent thereto, and boiling until the generated ammonia is driven off, then filtering and evaporating the filtrate, whereby the alkali salt of the new acid is obtained, then dissolving in water and acidulating the filtrate.

7. The process which consists in dissolving methyl-anil-alloxan in potash lye and adding mercuric oxid all in the proportions specified, and boiling in a reflux apparatus until all the ammonia has been liberated until generated ammonia has disappeared.

8. The process which consists in dissolving methyl-anil-alloxan in potash lye and adding mercuric oxid, all in the proportions specified, and boiling in a reflux apparatus until generated ammonia has disappeared, then filtering and evaporating the filtrate to dryness, digesting with alcohol and again evaporating.

9. The process which consists in dissolving methyl-anil-alloxan in potash lye and adding mercuric oxid all in the proportions specified, and boiling in a reflux apparatus until generated ammonia has disappeared, then filtering and evaporating the filtrate to dryness, digesting with alcohol and again evaporating, then dissolving the residue in water and acidulating with a mineral acid, whereby the new amido-phenylglyoxylic acid is precipitated.

10. As a new chemical compound, paramethyl-amido-phenylglyoxylic acid having the formula $CH_3.NH.C_6H_4.CO.COOH$ which is readily soluble in boiling water, cold alcohol, acetone, acetic ether, but soluble with difficulty in cold chloroform, ether and benzene, which softens on heating to 140°, centigrade, and is decomposed with frothing at 155°, to 157°, centigrade, and which forms short well-developed prisms of an orange color.

In testimony whereof I affix my signature in presence of two witnesses.

FRITZ ACH.

Witnesses:
LORENZ ACH,
JACOB ADRIAN.